United States Patent
Kaiser

(10) Patent No.: US 12,257,819 B1
(45) Date of Patent: Mar. 25, 2025

(54) MULTI-LAYER BARRIER FABRIC WITH EXTENDED BREAKTHROUGH TIME

(71) Applicant: United Tactical Supply, LLC, Surf City, NC (US)

(72) Inventor: Robert Kaiser, Edmonds, WA (US)

(73) Assignee: United Tactical Supply, LLC, Surf City, NC (US)

( * ) Notice: Subject to any disclaimer, the term of this patent is extended or adjusted under 35 U.S.C. 154(b) by 0 days.

(21) Appl. No.: 18/414,902

(22) Filed: Jan. 17, 2024

(51) Int. Cl.
| | |
|---|---|
| *B32B 5/26* | (2006.01) |
| *B32B 7/05* | (2019.01) |
| *B32B 7/12* | (2006.01) |
| *B32B 37/12* | (2006.01) |
| *F42D 5/04* | (2006.01) |

(52) U.S. Cl.
CPC .............. *B32B 5/26* (2013.01); *B32B 7/05* (2019.01); *B32B 7/12* (2013.01); *B32B 37/1207* (2013.01); *B32B 37/1284* (2013.01); *B32B 2037/1215* (2013.01); *B32B 2307/714* (2013.01); *B32B 2307/718* (2013.01); *B32B 2307/7376* (2023.05); *F42D 5/04* (2013.01)

(58) Field of Classification Search
None
See application file for complete search history.

(56) References Cited

U.S. PATENT DOCUMENTS

| | | |
|---|---|---|
| 6,070,578 A | 6/2000 | Baughman et al. |
| 7,160,369 B2 | 1/2007 | von Blücher et al. |
| 7,196,023 B2 | 3/2007 | Langley et al. |
| | (Continued) | |

FOREIGN PATENT DOCUMENTS

| | | | | |
|---|---|---|---|---|
| EP | 1433394 A1 * | 6/2004 | ......... | A41D 31/0016 |
| EP | 1859837 A2 | 11/2007 | | |
| | (Continued) | | | |

OTHER PUBLICATIONS

Boopathi, M., et al., "A Review on NBC Body Protective Clothing," Bentham Open, The Open Textile Journal, Oct. 2008, vol. 1, pp. 1-8.
(Continued)

*Primary Examiner* — Arti Singh-Pandey
(74) *Attorney, Agent, or Firm* — Cesari and McKenna, LLP; James A. Blanchette

(57) ABSTRACT

In one embodiment, a thin, lightweight, flexible, strong multi-layer barrier fabric is provided that offers extended breakthrough time against hazardous materials. The multi-layer barrier fabric is arranged as a layer stack that includes an inner layer of facing fabric, an adsorbent layer of adsorptive fabric, a barrier layer of low-permeability fabric and an outer layer of facing fabric. The facing fabric provides tensile strength. The adsorptive fabric and the low-permeability fabric interact synergistically. The barrier layer improves capture effectiveness of the adsorbent layer by both slowing down the hazardous material to increase its residence time in the adsorbent layer and decreasing the escape probability of stray molecules of hazardous material that are not initially intercepted by the adsorptive fabric. The adsorbent layer improves barrier effectiveness of the barrier layer by reducing the concentration of hazardous material challenging the low-permeability fabric of the barrier layer.

19 Claims, 3 Drawing Sheets

(56) References Cited

U.S. PATENT DOCUMENTS

| | | |
|---|---|---|
| 7,354,475 B2 | 4/2008 | Von Blücher |
| 7,410,693 B2 | 8/2008 | de Ruiter |
| 7,451,497 B2 | 11/2008 | von Blücher |
| 7,465,490 B2 | 12/2008 | Von Blücher |
| 7,572,322 B2 | 8/2009 | Bohringer et al. |
| 7,582,578 B2 | 9/2009 | Heinrich et al. |
| 7,700,501 B2 * | 4/2010 | Bohringer ............. B01D 53/88 2/457 |
| 7,730,555 B2 | 6/2010 | Hexels |
| 7,891,020 B2 | 2/2011 | Von Blücher |
| 8,016,926 B2 | 9/2011 | Bohringer et al. |
| 8,062,411 B2 | 11/2011 | von Blücher et al. |
| 8,074,299 B2 | 12/2011 | Brookman |
| 8,176,659 B2 | 5/2012 | von Blücher |
| 8,266,726 B2 | 9/2012 | Böhringer et al. |
| 8,366,816 B2 | 2/2013 | Böhringer et al. |
| 8,402,676 B2 | 3/2013 | von Blücher |
| 9,126,064 B2 | 9/2015 | Boye |
| 9,290,305 B2 | 3/2016 | Stefanek et al. |
| 9,849,055 B2 | 12/2017 | Vertsteylen et al. |
| 10,155,357 B2 | 12/2018 | Böhringer |
| 10,828,873 B1 | 11/2020 | Anderson et al. |
| 11,141,711 B2 | 10/2021 | Böhringer et al. |
| 11,246,371 B2 | 2/2022 | Baggen et al. |
| 2004/0060102 A1 | 4/2004 | Brookman |
| 2005/0037683 A1 | 2/2005 | Konishi et al. |
| 2005/0129914 A1 | 6/2005 | Rim et al. |
| 2008/0216218 A1 | 9/2008 | McKinney et al. |
| 2009/0211581 A1 | 8/2009 | Bansal |
| 2010/0319113 A1 * | 12/2010 | Rock ..................... B32B 5/26 2/457 |
| 2011/0113538 A1 | 5/2011 | von Blücher et al. |
| 2011/0114095 A1 | 5/2011 | Smith et al. |
| 2012/0084905 A1 | 4/2012 | von Blücher et al. |
| 2013/0115393 A1 | 5/2013 | Beck |
| 2015/0067999 A1 | 3/2015 | Stefanek et al. |
| 2015/0352392 A1 * | 12/2015 | Kaiser ..................... A62D 5/00 502/2 |
| 2022/0117352 A1 | 4/2022 | Baggen et al. |

FOREIGN PATENT DOCUMENTS

| | | |
|---|---|---|
| WO | WO-2023/037378 A1 | 3/2023 |
| WO | WO-2023/245303 A1 | 12/2023 |

OTHER PUBLICATIONS

"Chemical and Biological Defense Program: FY23.3 Small Business Innovation Research (SBIR), Proposal Submission Instructions," CBD SBIR Phase I, Aug. 22, 2023, pp. 1-19.

"ChemMax® 2," Lakeland Protective Wear, Lakeland, Mar. 25, 2015, one page.

"DuPont Permeation Guide," Du Pont, Tychem, Tyvek, Aug. 27, 2019, pp. 1-57.

"DuPont™ Tychem® SL: Lightweight Protection of DuPont™ Tyvek® Laminated with a Chemical-Resistant Saranex® Film," Technical Data Sheet, Du Pont, May 18, 2014, pp. 1-2.

"Flexzorb™ Defence," Flexzorb™ Activated Carbon Cloth for the Defence Sector, Chemviron, CalgonCarbon, Jun. 14, 2019, pp. 1-2.

"Flexzorb™ Industry," Flexzorb™ Activated Carbon Cloth for Industrial Sectors, Chemviron, CalgonCarbon, Dec. 6, 2016, pp. 1-2.

"Joint Service Lightweight Integrated Suit Technology (JSLIST)," U.S. Army Equipment Information, "Army Study Guide," Education Dynamics, Sep. 17, 2023, one page.

Kaiser, Robert, et al., "Effect of Pore Size Distribution of Commercial Activated Carbon Fabrics on the Adsorption of CWA Simulants from the Liquid Phase," American Chemical Society, Feb. 25, 2007, pp. 1-7.

Maes, Caroline, et al., "Recent Updates on the Barrier Properties of Ethylene Vinyl Alcohol Copolymer (EVOH): A Review," Taylor & Francis Group, LLC, Taylor & Francis, Polymer Reviews, vol. 58, No. 2, Jan. 18, 2018, pp. 209-246.

"Test Operations Procedure (TOP) 08-2-501A: Permeation Testing of Materials With Chemical Agents or Simulants (Swatch Testing)," US Army Test and Evaluation Command Test Operations Procedure, Report Documentation Page, U.S. Army Dugway Proving Ground West Desert Test Center, Range Infrastructure Division (CSTE-TM) U.S. Army Test and Evaluation Command, Aug. 5, 2013, pp. 1-73.

"Test Operations Procedure (TOP) 08-2-503: Low Volatility Agent Permeation (LVAP) Swatch Testing," US Army Test and Evaluation Command Test Operations Procedure, Report Documentation Page,. U.S. Army Dugway Proving Ground West Desert Test Center, Policy and Standardization Division (CSTE-TM) U.S. Army Test and Evaluation Command, Feb. 20, 2018, pp. 1-41.

Tripathi, Nagesh K., et al., "Activated Carbon Fabric: An Adsorbent Material for Chemical Protective Clothing," DESIDOC, Core, Defence Science Journal, vol. 68, No. 1, Jan. 2018, pp. 83-90.

"U.S. Office Action Summary," United States Patent and Trademark Office, Dec. 30, 2020, pp. 1-15.

"U.S. Office Action Summary," United States Patent and Trademark Office, Jul. 7, 2021, pp. 1-28.

"Zoroflex® Antimicrobial Carbon Cloth Dressing," Wound Remediation, NovaGran Wound Care Products, Chemviron Carbon Limited, Principle Business Enterprises, Inc., 12NG-006-SL16, Dec. 16, 2016, pp. 1-2.

"CBAG™ Contaminated Human Remains Pouch 2005CB-PUR," ISOVAC Products, LLC, Dec. 31, 2016, pp. 1-3.

Dupont TychemF(R) Datasheet K27922, Jul. 2014 (Year: 2014).

Dupont Tyvek(R): https://www.dupont.com/tyvekdesign/design-with-tyvek/why-tyvek.html (Year: 2021).

U.S. Appl. No. 16/844,635, filed Apr. 9, 2020 by Robert Kaiser for Containment Pouch for the Safe Transport and Temporary Storage of Objects That Contain or Are Contaminated By Hazardous Materials, pp. 1-30.

U.S. Appl. No. 16/844,729, filed Apr. 9, 2020 by Robert Kaiser for Containment Pouch for the Safe Transport and Temporary Storage of Objects That Contain or Are Contaminated By Hazardous Materials, pp. 1-30.

* cited by examiner

MULTI-LAYER BARRIER FABRIC WITH EXTENDED BREAKTHROUGH TIME

BACKGROUND

Technical Field

The present disclosure relates generally to protective fabrics, and more to particularly to fabrics adapted to provide a barrier against hazardous materials.

Background Information

When dealing with hazardous materials, such as chemical warfare agents (CWAs) (e.g., vesicants, nerve agents, etc.), biological warfare agents (BWAs) (e.g., bacterial agents, viral agents, toxins, etc.) and toxic industrial chemicals (TICs) (e.g., pesticides, solvents, etc.) there is a need for protective fabrics. Such fabrics may be adapted to prevent transmission of hazardous materials from a contaminated environment (i.e., an environment containing hazardous material) to a clean environment (i.e., an environment free of hazardous material) to prevent harm to human health.

One application of protective fabrics is personal protective equipment (PPE), such as chemical-biological protective suits, individual pieces of protective clothing, gloves, masks, etc. Low-permeability barriers may be unsuitable for many types of PPE (e.g., especially PPE used in warm or hot climate) since they aggravate the dangers of body heat stress by sweat evaporation and disrupt the normal cooling processes of the body. As such, many protective fabrics used in PPE are air-permeable and water-vapor permeable filter materials, which are designed to remove hazardous gases or liquids, but are permeable to air, water vapor and other common non-hazardous atmospheric gases. The protective fabrics used in PPE often have breakthrough times of the order of hours (e.g., about 8-12 hours). However, given the length of a time someone can reasonably be expected to work in PPE, these short breakthrough times are often not a problem (e.g., since one can simply put on a fresh set of PPE).

However, other applications of protective fabrics may demand longer breakthrough times. There is a need for protective fabrics for use in contaminated object containers (COCs), collective protection (CP) structures, and other similar applications. A COC is a container designed to enclose items contaminated with hazardous materials for transportation or storage. In the inverse of PPE, COCs are designed to prevent hazardous materials from escaping an internal contaminated environment and entering an external clean environment. Many COCs require breakthrough times of the order of weeks (e.g., 2 weeks (336 hrs.) or more). A CP structure is a temporary structure for living, working or storing equipment while avoiding contamination. Similar to PPE, a CP structure is designed to prevent entry of hazardous materials from an extremal contaminated environment to an internal clean environment, only at a much larger scale such that, for example, multiple people may live or work within the structure. Many CP structures require breakthrough times of the order of days (e.g., 3 days (72 hrs.) or more).

Fabrics designed for PPE are typically unable to provide the extended breakthrough times desired for COCs, CP structures and other similar applications. One conventional approach for extending breakthrough time is to increase the thickness of the fabric. However, thick fabrics often have other undesirable properties. For example, they are often heavy and have limited flexibility, making enclosures or structures constructed from them difficult to transport, pack, setup, etc. Another conventional approach for extending breakthrough time is to use multiple nested enclosures or shells of fabric (e.g., so that hazardous material needs to breakthrough multiple individual enclosures or shells). However, in addition to adding compilation, the resulting nested arrangement may be even heavier and stiffer than a single thick fabric, leading to the same issues of transport, packing, setup, etc. Further, conventional attempts to decrease weight and stiffness often compromise tensile strength, which may be required to prevent a COC or CP structure from being torn, punctured, abraded, etc. in use and thereby fail.

Accordingly, there is a need for a thin, lightweight, flexible, strong fabric that can prevent breakthrough of hazardous materials (e.g., CWAs, BWAs, or TICs) for an extended period of time (e.g., $\geq 336$ hrs.)

SUMMARY

A thin, lightweight, flexible, strong multi-layer barrier fabric is provided that offers extended breakthrough time against hazardous materials (e.g., CWAs, BWAs, or TICs). In various embodiment, the multi-layer barrier fabric is arranged as a layer stack that includes, for example, an inner layer of facing fabric, an adsorbent layer of adsorptive fabric, a barrier layer of low-permeability fabric and an outer layer of facing fabric, bonded together (e.g., by hot melt adhesion or adhesive). The facing fabric of the inner layer outer layer provides tensile strength and resistance to physical damage. The adsorptive fabric of the adsorbent layer and the low-permeability fabric of the barrier layer interact synergistically to achieve extended breakthrough time. For example, the barrier layer improves capture effectiveness of the adsorbent layer by both slowing down the hazardous material to increase its residence time in the adsorbent layer and decreasing the escape probability of stray molecules of hazardous material that are not initially intercepted by the adsorptive fabric. Likewise, the adsorbent layer improves barrier effectiveness of the barrier layer by reducing the concentration of hazardous material challenging the low-permeability fabric of the barrier layer, thus decreasing the permeation driving force. The synergist effects may yield breakthrough times for commonly-encountered hazardous materials that are more than an order of magnitude greater than present commercially available fabrics (e.g., $\geq 336$ hrs. vs about 12 hrs.).

In one example embodiment, a multi-layer barrier fabric adapted to provide a barrier against a hazardous material includes an inner layer of facing fabric having an inner face configured to contact an environment containing hazardous material. The multi-layer barrier fabric also includes an adsorbent layer of adsorptive fabric disposed adjacent to the inner layer and configured to adsorb the hazardous material to reduce concentration of the hazardous material and thereby permeation driving force. The multi-layer barrier fabric further includes a barrier layer of low-permeability fabric disposed adjacent to the adsorbent layer and configured to increase residence time of the hazardous material in the adsorptive fabric and to decrease escape probability of stray molecules of hazardous material that are not initially intercepted by the adsorptive fabric. The multi-layer barrier fabric further includes an outer layer of facing fabric disposed adjacent to the barrier layer and having an outer face configured to contact an environment free of hazardous material.

In another example embodiment, a multi-layer barrier fabric adapted to provide a barrier against a hazardous material includes an inner layer of nylon or polyester fabric having an inner face configured to contact an environment containing hazardous material. The multi-layer barrier fabric also includes an adsorbent layer of knitted, woven or-non-woven activated carbon fabric disposed to an outer side of the inner layer and configured to adsorb the hazardous material to reduce concentration of the hazardous material and thereby permeation driving force. The multi-layer barrier fabric further includes a barrier layer of chemical resistant thermoplastic polymer film that is substantially impermeable to air and water vapor disposed to an outer side of the adsorbent layer and configured to increase residence time of the hazardous material in the activated carbon fabric and to decrease escape probability of stray molecules of hazardous material that are not initially intercepted by the activated carbon fabric.

In still another example embodiment, a method of producing a multi-layer barrier fabric adapted to provide a barrier against a hazardous material includes stacking a series of layers of fabric that include an inner layer of facing fabric, an adsorbent layer of adsorptive fabric configured to adsorb the hazardous material to reduce concentration of the hazardous material and thereby permeation driving force, a barrier layer of low-permeability fabric configured to increase residence time of the hazardous material in the adsorptive fabric and to decrease escape probability of stray molecules of hazardous material that are not initially intercepted by the adsorptive fabric, and an outer layer of facing fabric. The method further includes bonding the series of layers of fabric using hot melt adhesion or adhesive.

It should be understood that a variety of additional features and alternative embodiments may be implemented other than those discussed in this Summary. This Summary is intended simply as a brief introduction to the reader for the further description that follows and does not indicate or imply that the examples mentioned herein cover all aspects of the disclosure or are necessary or essential aspects of the disclosure.

BRIEF DESCRIPTION OF THE DRAWINGS

The description below refers to the accompanying drawings of example embodiments, of which.

DETAILED DESCRIPTION OF EXAMPLE EMBODIMENTS

Definitions

Figure 1A:
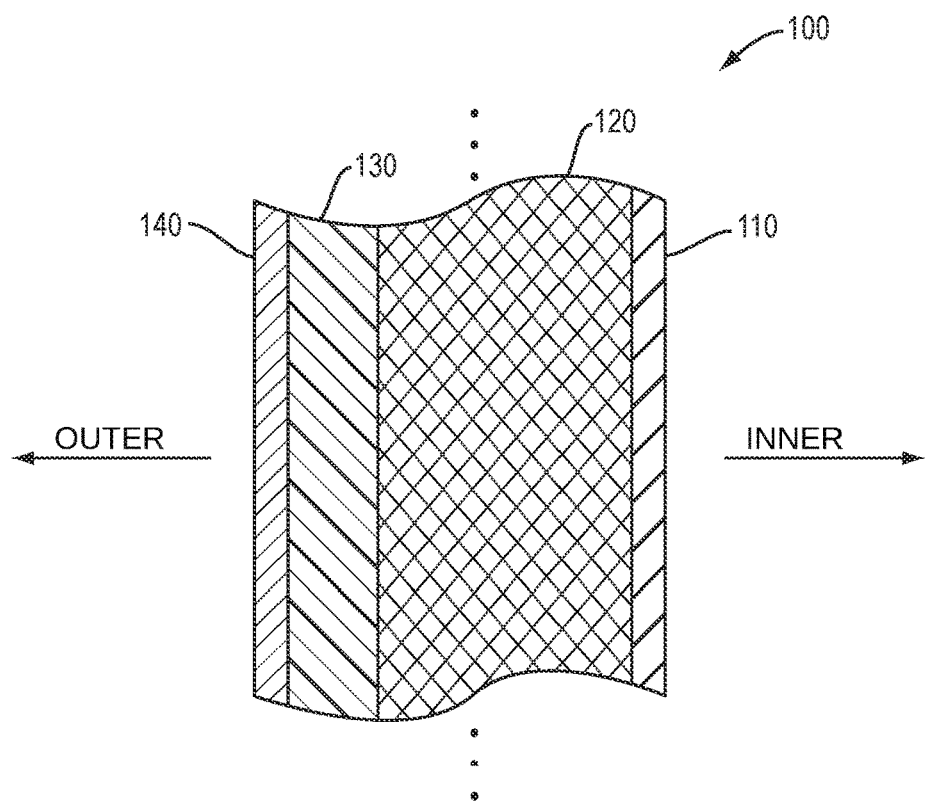
FIG. 1A is a schematic diagram of a first example layer stack of a thin, lightweight, flexible, strong multi-layer barrier fabric adapted to provide a barrier against a hazardous material.

As used herein, the term "hazardous material" refers to a liquid, gas or other substance that poses a risk to human health and safety or the environment. Examples of hazardous materials include CWAs, BWAs and TICs.

As used herein, the term "breakthrough time" refers to the amount of time required for a detectable level of a hazardous material to pass through a material (e.g., a barrier fabric). It is generally regarded as a measure of the effectiveness of protection provided by a material (e.g., barrier fabric).

As used herein, the term "air-permeable" refers to the property of being substantially permeable to air, wherein substantially permeable to air considered to be permeability greater than 20 $cm^3/m^2/24$ hr at 1 atmosphere pressure difference ($\Delta P$).

As used herein, the term "low-permeability" refers to the property of being substantial impermeable to air, water vapor and common atmospheric gasses, wherein substantial impermeable to air, water vapor and common atmospheric gasses is considered to be a permeability to air less than or equal to 20 $cm^3/m^2/24$ hr. at 1 atmosphere $\Delta P$ and a permeability to water vapor less than or equal to 40 $g/m^2/24$ hr. at 38° C. and 90% relative humidity (RH). A "low-permeability" material will typically also be substantially impermeable to hazardous materials over a certain period of time.

Example Embodiments

The following description describes example embodiments. Any references to items in the singular should be understood to include items in the plural, and vice versa, unless explicitly stated or otherwise clear from the context. Grammatical conjunctions are intended to express any and all disjunctive and conjunctive combinations of conjoined clauses, sentences, words, and the like, unless otherwise stated or clear from the context. For example, the term "or" should be understood to mean "and/or." Any recitations of ranges of values are not intended to be limiting, are provided as examples only, and are not intended to constitute a limitation on the scope of the described embodiments. Further, any recitation of ranges should be interpreted as referring individually to any and all values falling within the range, unless otherwise indicated, and each separate value within such the range should be treated as if it were individually recited. Terms of approximation such as "about," "approximately," "substantially" or the like, should be construed as referring to an allowance for deviation that is appreciated by one of ordinary skill in the art. Terms of relative ordering or orientation, such as "first," "last," "greatest", "least", "top," "bottom," "inner", "outer" and the like, should be understood to be used relative to a selected standard of comparison or perspective. Such terms of relative ordering or orientation do not preclude differing orderings or orientations when a different standard of comparison or perspective is used. No language in the description should be construed as indicating an element is a necessary or essential aspect of the disclosure.

FIG. 1A is a schematic diagram of a first example layer stack of a thin, lightweight, flexible, strong multi-layer barrier fabric adapted to provide a barrier against a hazardous material. In this example, the term "inner" is used to refer to a direction perpendicular to the layers of the layer stack designed to be towards an environment containing hazardous material, and the term "outer" is used to refer to the opposite direction, designed to be towards an environment free of hazardous material. It should be understood that depending upon the particular application of the multi-layer barrier fabric (e.g., whether it is being used to perform a containment function such as in a COC or an exclusion function such as in a CP structure), which direction is considered "inner" and which direction is considered "outer" may be reversed.

The example layer structure includes an inner layer 110 of facing fabric with an inner face configured to contact an environment containing hazardous material, an adsorbent layer 120 of adsorptive fabric disposed adjacent to the inner layer, a barrier layer 130 of low-permeability fabric disposed adjacent to the adsorbent layer, and an outer layer 140 of facing fabric disposed adjacent to the barrier layer and having an outer face configured to contact an environment free of hazardous material. The fabric of each layer may be commercial-off-the-shelf (COTS) fabric to lower manufacturing cost.

The facing fabric of the inner layer 110 and outer layer 140 provides tensile strength and resistance to physical damage while being highly flexible. A variety of air-permeable fabrics may be employed, such as a nylon fabric, a polyester fabric, or another similar fabric. In one embodiment, the same fabric is used for both the inner layer 110 and the outer layer 140. However, in an alternative embodiment, two different fabrics may be employed.

The facing fabric of the inner layer 110 and outer layer 140 may include various durability-enhancing features. For example, such fabric may be ripstop. Ripstop fabrics are woven with a special reinforcement technique that makes them resistant to tearing and ripping. During weaving, thick reinforcement threads are typically interwoven at regular intervals (e.g., every 5 mm to 8 mm) in a crosshatch pattern, to prevent the spread of small tears, while not adding significant additional weight.

The inner layer 110 may add resistance to damage from contact with contaminated objects in the environment contaminated with hazardous material, while the outer layer 140 may provide resistance to damage originating from the clean environment. The layers 110, 140 may work synergistically with the other layers 120, 130 of the multi-layer barrier fabric to achieve tensile strength greater than their combined individual property values.

Preferred property values of the facing fabric of the inner layer 110 and outer layer 140 are shown below in Table 1. In one embodiment, the facing fabric of the inner layer 110 outer layer 140 may be Precision Fabrics Group™ (PFG) 66387 rip stop nylon type I/Ia parachute cloth (MIL-C-7020H). Specific property values of PFG 66387 are also shown in Table 1.

TABLE 1

| Property | Units | Preferred Value | Value for PFG 66387 |
|---|---|---|---|
| Areal Density: | g/m$^2$ | ≤3.5E+01 | 3.46E+01 |
| Thickness | mm | ≤1.0E−01 | 7.00E−02 |
| Air Permeability | cm$^3$/cm$^2$/sec @ 1 atmosphere ΔP | ≥4.0E+03 | 4.13E+03 |
| Air Permeability | cm$^3$/cm$^2$/24 hr @ 1 atmosphere ΔP | ≥3.5E+08 | 3.57E+08 |
| Tensile Strength | N/mm (ASTM-D-5035) | ≥7.0E+00 | 7.90E+00 |
| Flexibility | mg-cm | ≤1.0E+02 | 4.17E+00 |

The adsorbent layer 120 of adsorptive fabric serves to capture (i.e., adsorb) hazardous materials. A variety of adsorptive fabrics may be employed, including knitted, woven or non-woven activated carbon fabrics. Activated carbon fabric is a textile produced from activated carbon that has a microporous structure giving it a large surface area. The combination of this large surface area and strong secondary valence forces and/or electrostatic forces allow activated carbon fabric to adsorb a large volume of organic or inorganic molecules, including those found in many hazardous materials (e.g., CWAs and TICs). Activated carbon fabric also exhibits antiviral and viricidal properties. The antimicrobial properties of activated carbon may be enhanced by impregnation of metallic silver nano and micro particles, making it effective against other hazardous materials (e.g., BWAs).

Preferred property values of the adsorbent layer 120 of adsorptive fabric are shown below in Table 2. In one embodiment, the adsorptive fabric of the adsorbent layer 120 may be Calgon Carbon Flexzorb™ FM-50K double jersey knit activated carbon fabric. Specific property values of FM-50K are also shown in Table 2.

TABLE 2

| Property | Units | Preferred Value | Value for FM-50K |
|---|---|---|---|
| Equilibrium Vapor Pressure of Agent at a Surface Loading of 10 g/m$^2$ | | | |
| GB | torr | ≤3.0E−03 | 3.0E−07 |
| GD | torr | ≤3.0E−07 | 3.0E−14 |
| VX | torr | ≤5.0E−10 | <1.0E−18 |
| HD | torr | ≤2.0E−09 | 8.0E−15 |
| Areal Density | g/m$^2$ | ≤2.4E+02 | 1.3E+02 |
| Thickness | mm | <2.0E+01 | 5.0E−01 |
| Air Permeability | cm$^3$/cm$^2$/sec @ 10 mm w.g. ΔP | ≥2.0E+01 | 7.5E+01 |
| Air Permeability | cm$^3$/cm$^2$/24 hr @ 10 mm w.g. ΔP | ≥1.7E+05 | 6.5E+06 |
| Flexibility | mg-cm | ≤1.0E+03 | 3.8E+01 |

Alternatively, the adsorptive fabric of the adsorbent layer 120 may be another type of fabrics, such as Calgon Carbon Flexzorb™ FM-10 or Calgon Carbon Flexzorb™ FM-100. Selected property values of Calgon Carbon Flexzorb™ FM-10 and Calgon Carbon Flexzorb™ FM-100 are shown below in Table. 3.

TABLE 3

| Fabric | Thickness, mm | Construction | Areal Density, g/m$^3$ | Air Permeability, cm$^3$/cm$^2$/sec @ 10 mm w.g. ΔP | Air Permeability, cm$^3$/cm$^2$/24 hr @ 10 mm w.g. ΔP |
|---|---|---|---|---|---|
| FM-10 | 0.5 | 1/1 Plain Weave | 120 | 100 | 8.64E+06 |
| FM 100 | 1.0 | 1/1 Compound Weave | 220 | 60 | 5.18E+06 |

The thickness of the adsorbent layer 120 may be selected to ensure that the stack of layers meets an overall flexibility requirement of the multi-layer fabric. Since the adsorbent layer 120 is typically the thickest, least flexible layer of the stack, its properties may dominate the overall flexibility. A piece of fabric can be viewed as a beam of low mechanical rigidity, whose flexural properties are governed by the laws of mechanics and strength of materials. The curvature of the deflection curve of a rectangular beam in bending can be expressed as:

$$\frac{1}{\rho} = M/EI$$

where $\rho$ is radius of curvature, E is modulus of elasticity, M is bending moment and I is moment of inertia of a cross section with respect to a neutral axis. The moment of inertia of a rectangular beam through its central axis may be expressed as:

$$I = bh^3/12$$

where b is the width of the beam, h is the thickness of the beam, and I is the moment of inertia of a cross section with respect to a neutral axis. As may be observed, everything else being equal, as the thickness of a beam (or of a layer of fabric) increases, the rigidity increases as the third power of thickness.

The thickness of the adsorbent layer 120 may have an even greater effect on flexibility if area bonding is used to bond the adsorbent layer 120 to the other layers 110, 130, 140 of the stack. Area bonding refers to attachment of a layer uniformly across its total area. By contrast, periphery bonding refers to attachment of a layer only at selected locations (e.g., at its perimeter). With area bonding, the resulting layer stack behaves mechanically as a single entity whose thickness is the sum of the thicknesses of individual layers. If area bonding is used, it may be especially desirable to maintain the adsorbent layer 120 as thin as possible.

The barrier layer 130 of low-permeability fabric interacts synergistically with the adsorbent layer 120 to achieve extended breakthrough time. Such extended breakthrough may not be possible by either layer in isolation. First, the barrier layer 130 improves capture effectiveness of the adsorbent layer 120. The barrier layer 130 slows down the hazardous material to increase its residence time in the adsorbent layer, so that the hazardous material is in contact with the adsorptive fabric for longer. In general, increasing contact time between an adsorbate and an adsorbent will improve capture efficiency. Further, the barrier layer 130 decreases the escape probability of stray molecules of hazardous material that are not initially intercepted by the adsorptive fabric (e.g., due to irregularities in the structure of the adsorptive fabric) to increase a probability that the stray molecules are adsorbed. By decreasing this sort of by-passing, capture efficiency is also improved.

Second, the adsorbent layer 120 improves barrier effectiveness of the barrier layer 130. The adsorbent layer 120 reduces the concentration of hazardous material challenging the low-permeability fabric of the barrier layer 130, thus reducing the permeation driving force. Breakthrough time of a substantially impermeable barrier is generally a function of its thickness and permeation driving force. Permeation driving force depends on the molecular structure of the hazardous material, the concentration of the hazardous material, presence of other chemicals that may modify the molecular structure of the hazardous material, as well as environmental conditions. By reducing the effects of at least one of these factors (the concentration of the hazardous material), the adsorbent layer 120 allows the low-permeability fabric of the barrier layer 130 to withstand a hazardous material for a longer period of time before breakthrough than non-synergistic combinations.

Preferred property values of the barrier layer 130 of low-permeability fabric are shown below in Table 4. The low-permeability fabric of the barrier layer 130 may be chemical resistant thermoplastic polymer film. In one embodiment, the low-permeability fabric of the barrier layer 130 may be Saranex™ 23P (polyvinylidene chloride (PVDC) film.

TABLE 4

| Property | Units | Preferred Value | Value for Saranex 23P |
|---|---|---|---|
| Areal Density: | $g/m^2$ | ≤2.0E+02 | 5.20E+01 |
| Thickness | μm | ≤5.1E+01 | 5.1E+01 |
| $O_2$ Permeability | $cm^3/m^2/24$ hr (ASTM D3985) | ≤2.0E+01 | 1.2E+01 |
| $N_2$ Permeability | $cm^3/m^2/24$ hr (ASTM D3985) | ≤2.0E+00 | 6.4E−01 |
| Air Permeability | $cm^3/m^2/24$ hr (Calculated) | ≤4.0E+00 | 1.23E+00 |
| Water Vapor Transmission Rate @ 38° C. and 90% RH | $g/m^2/24$ hr | ≤4.0E+01 | 3.90E+00 |
| Flexibility: | mg-cm | ≤1.0E+02 | 1.43E+00 |

Alternatively, the low-permeability fabric of the barrier layer 130 may be EVAL® polyethylene-vinyl alcohol copolymer film, Saranex™ VC PVDC film, oriented Nylon 6 film, oriented polyester film, high-density polyethylene (HDPE) film, low-density polyethylene (LDPE) film, oriented polyethylene film, polystyrene film, oriented nylon film, Polyethylene terephthalate (PET) film, polyvinylidene dichloride (PVDC) film, or another type of single or multilayer structure composed of one or multiple different types of material. Selected property values of alternative low-permeability fabrics are shown below in Tables 5A-B and 6A-B.

TABLE 5A

| Low-Permeability Fabric/Film | Thickness, μm | $O_2$ Transmission Rate | | $N_2$ Transmission Rate | |
|---|---|---|---|---|---|
| | | $cm^3/m^2/24$ hr [23° C. @ 0% RH, 1 atm ΔP] | $cm^3/m^2/sec$ | $cm^3/m^2/24$ hr [23° C. @ 0% RH, 1 atm ΔP] | $cm^3/m^2/sec$ |
| Eval F (32% $C_2$) | 25 | 2.00E−01 | 2.31E−06 | 1.50E−02 | 1.74E−07 |
| Eval F (38% $C_2$) | 25 | 3.95E−01 | 4.57E−06 | 6.20E−02 | 7.18E−07 |
| Saran VC PVDC | 25 | 2.33E+00 | 2.69E−05 | 1.86E−01 | 2.15E−06 |
| Oriented Nylon 6 | 25 | 2.56E+01 | 2.96E−04 | 1.08E+01 | 1.25E−04 |
| Oriented Polyester | 25 | 3.56E+01 | 4.13E−04 | 7.10E+00 | 8.22E−05 |
| HDPE | 25 | 2.33E+03 | 2.69E−02 | | |
| LDPE | 25 | 8.59E+03 | 9.94E−02 | | |
| Oriented Polypropylene | 25 | 2.53E+03 | 2.92E−02 | | |
| Polystyrene | 25 | 4.03E+03 | 4.66E−02 | | |

TABLE 5B

| Low-Permeability Fabric/Film | Thickness, μm | Air Transmission Rate (*) $cm^3/m^2/24$ hr [23° C. @ 0% RH, 1 atm ΔP] | $cm^3/m^2/sec$ [23° C. @ 0% RH, 1 atm ΔP] | Moisture Vapor Transmission Rate g. 25 μm/$m^2$-24 hrs |
|---|---|---|---|---|
| Eval F (32% $C_2$) | 25 | 2.00E−01 | 2.31E−06 | 58.9 |
| Eval F (38% $C_2$) | 25 | 3.95E−01 | 4.57E−06 | 32.6 |
| Saran VC PVDC | 25 | 2.33E+00 | 2.69E−05 | 3.4 |
| Oriented Nylon 6 | 25 | 2.56E+01 | 2.96E−04 | 158.1 |
| Oriented Polyester | 25 | 3.56E+01 | 4.13E−04 | 18.6 |
| HDPE | 25 | 2.33E+03 | 2.69E−02 | 5.9 |
| LDPE | 25 | 8.59E+03 | 9.94E−02 | 17.7 |
| Oriented Polypropylene | 25 | 2.53E+03 | 2.92E−02 | 5.9 |
| Polystyrene | 25 | 4.03E+03 | 4.66E−02 | 131.8 |

(*) Estimated values based on the sum of 20% of the $O_2$ transmission rate and 80% of the $N_2$ transmission rate.

TABLE 6A

| Low-Permeability Fabric/Film | Thickness, μm, mils | Permeability Rate of Organic Solvents g/$m^2$/24 hr | | | |
|---|---|---|---|---|---|
| | | Chloroform | Xylene | MEK | Kerosene |
| Eval F | 2.03E+01 | 2.02E+00 | 1.09E+00 | 3.88E+00 | <4.65E−02 |
| Eval EF | 3.18E+01 | 4.65E+00 | <4.65E−02 | 3.10E−01 | <4.65E−02 |
| Saran VC PVDC | 1.52E+01 | 1.55E−01 | 4.65E−01 | 3.10E−01 | <4.65E−02 |
| LDPE | 5.08E+01 | 2.76E+03 | 3.25E+02 | 7.39E+01 | 7.60E+01 |
| Oriented Polypropylene | 2.03E+01 | 3.74E+03 | 3.50E+02 | 1.19E+01 | 5.30E+01 |
| Oriented Nylon | 2.54E+01 | 1.35E+01 | 9.30E−01 | 2.64E+00 | 3.10E−01 |
| PET | 2.54E+01 | 3.10E+02 | 1.71E+00 | 1.55E+00 | 4.65E−01 |
| PVDC | 1.52E+01 | 8.68E+00 | 7.75E−01 | 1.55E+00 | <4.65E−02 |

TABLE 6B

| Low-Permeability Fabric/Film | Thickness, μm, mils | Permeability Rate of Organic Solvents g/$m^2$/sec | | | |
|---|---|---|---|---|---|
| | | Chloroform | Xylene | MEK | Kerosene |
| Eval F | 2.03E+01 | 2.33E−05 | 1.26E−05 | 4.48E−05 | <5.38E−07 |
| Eval EF | 3.18E+01 | 5.38E−05 | <5.38E−07 | 3.59E−06 | <5.38E−07 |
| Saran VC PVDC | 1.52E+01 | 1.79E−06 | 5.38E−06 | 3.59E−06 | <5.38E−07 |
| LDPE | 5.08E+01 | 3.20E−02 | 3.76E−03 | 8.56E−04 | 8.79E−04 |
| Oriented Polypropylene | 2.03E+01 | 4.33E−02 | 4.05E−03 | 1.38E−04 | 6.14E−04 |
| Oriented Nylon | 2.54E+01 | 1.56E−04 | 1.08E−05 | 3.05E−05 | 3.59E−06 |
| PET | 2.54E+01 | 3.59E−03 | 1.97E−05 | 1.79E−05 | 5.38E−06 |
| PVDC | 1.52E+01 | 1.00E−04 | 8.97E−06 | 1.79E−05 | <5.38E−07 |

The layers of the stack may be bonded to each other by applying heat over the entire area (i.e., for area bonding) or selected areas (i.e., for periphery bonding) to promote hot melt adhesion. Hot melt adhesion may require melting points in a particular temperature range. Some layers may already have low melting points, so they may be readily bonded by hot melt adhesion without additional preparation. For example, the barrier layer 130 may already have a low melting point. Other layers may require addition of a low melting point outer film to promote hot melt adhesion, for example, addition of an adhesive layer between two layers to be bonded. To that end, one or more adhesive layers may be added to the layer structure of FIG. 1A.

Figure 1B:
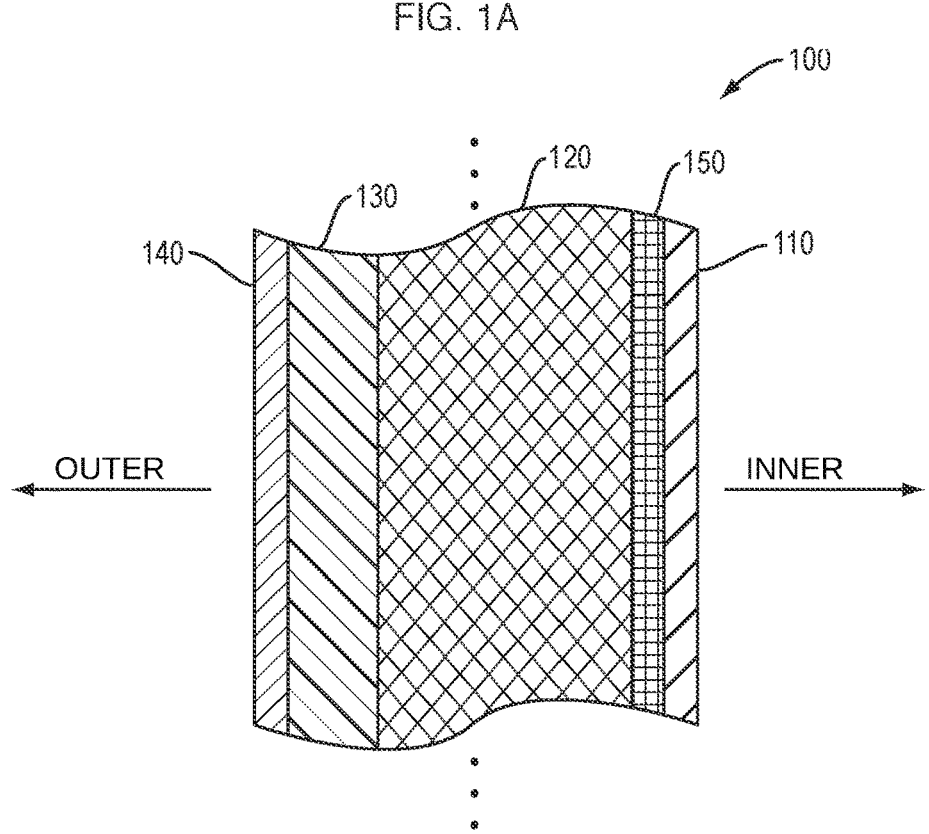
FIG. 1B is a schematic diagram of a second example layer stack of a thin, lightweight, flexible, strong multi-layer barrier fabric adapted to provide a barrier against a hazardous material.

FIG. 1B is a schematic diagram of a second example layer stack of a thin, lightweight, flexible multi-layer barrier fabric adapted to provide a barrier against a hazardous material. The example layer stack includes an inner layer 110 of facing fabric, an adhesive layer 150, an adsorbent layer 120 of adsorptive fabric, a barrier layer 130 of low-permeability fabric and an outer layer 140 of facing fabric. Layers 110-140 may be as described above. The adhesive layer 150 may be a layer of permeable adhesive. In one embodiment, the permeable adhesive may be a nonwoven thermoplastic adhesive polymer resin web, such as SpunFab™ PE 2302 or another similar web adhesive. Alternatively, the permeable adhesive may be another type of adhesive that is thinly spread between the inner layer 110 and the adsorbent layer 120.

It should be understood that a variety of other layer structures may be used for the of the multi-layer fabric laminate that include additional layers, omit layers or combine the function of multiple layers into a single layer. For example, an additional layer of adsorptive fabric, low-permeability fabric, adhesive or other material may be added to the example layer structure shown in FIG. 1A or 1B. Likewise, functionality of a layer 110, 140 of facing fabric and the barrier layer 130 of low-permeability fabric, or of two or more other layers, may be combined into a single layer.

Figure 1C:
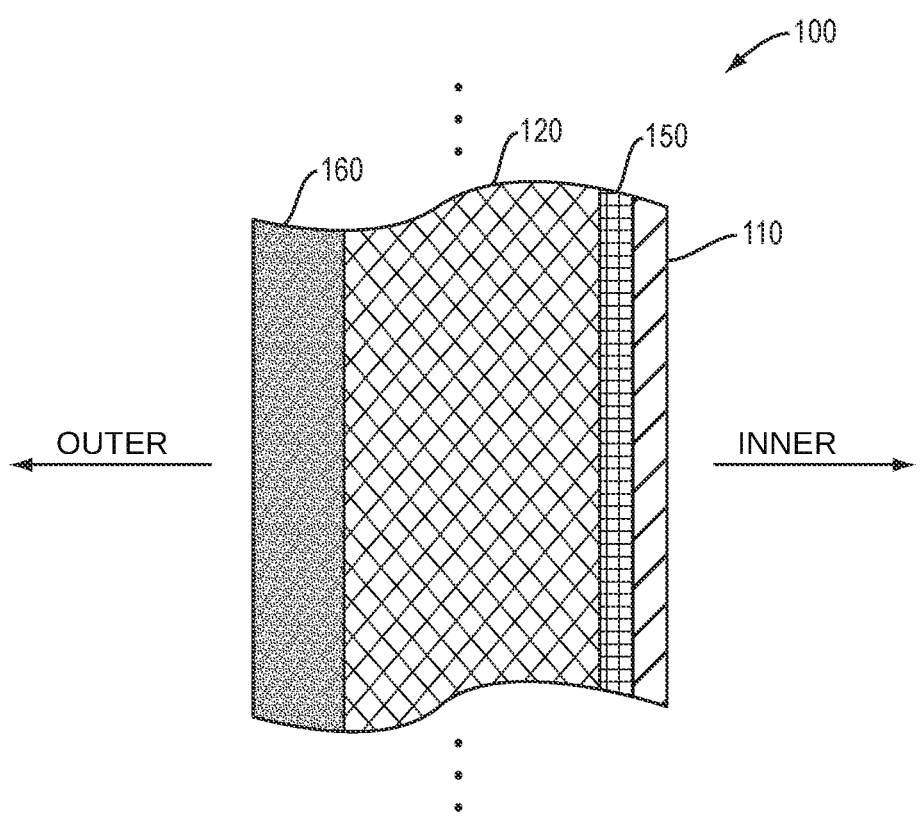
FIG. 1C is a schematic diagram of a third example layer stack of a thin, lightweight, flexible, strong multi-layer barrier fabric adapted to provide a barrier against a hazardous material.

FIG. 1C is a schematic diagram of a third example layer stack of a thin, lightweight, flexible multi-layer barrier fabric adapted to provide a barrier against a hazardous material. The example layer structure includes an inner layer 110 of facing fabric, an adhesive layer 150, an adsorbent layer 120 of adsorptive fabric and a combined barrier layer/outer layer 160 of low-permeability facing fabric. Layers 110, 120 and 150 may be as described above. The combined barrier layer/outer layer 160 may be a type of impermeable chemical resistant thermoplastic polymer film, such as DuPont Tychem® F. In some applications, the tensile strength and protection against tearing, puncturing, abrading, etc. provided by such a polymer film may be sufficient.

A multi-layer barrier fabric produced as described above may be thin, lightweight, flexible, strong. In one embodiment, the multi-layer barrier fabric may have a total thickness less than or equal to 1000 μm (preferably, less than or equal to 610 μm (approximately 24 mil)), a weight less than or equal to 500 g/$m^2$ (preferably less than or equal 292 g/$m^2$ (approximately 8.6 oz/$yd^2$)), an overall flexibility greater than or equal to 10,000 mg-cm (preferably greater than or equal to 3300 mg-cm), and a tensile strength greater than or equal to 200 (preferably greater than or equal to 400 N).

In addition to these characteristics, a multi-layer barrier fabric produced as described may exhibit breakthrough times for commonly-encountered hazardous materials that are more than an order of magnitude greater than present commercially available fabrics (as a result to the synergistic effects discussed above). A comparison of the multi-layer barrier fabric against several Tychem® fabrics available from Dupont is shown below in Table 7. As may be observed, while these commercially available fabrics have breakthrough times of about 12 hours, the multi-layer barrier fabric may achieve breakthrough times exceeding 336 hours (14 days).

TABLE 7

| Product | Unit | Tychem SL | Tychem F | Tychem LC | Tychem TK | Five Layer Barrier Fabric (Rip Stop Nylon/ Saranex 23P/ Flexzorb FM-50K/ Web Adhesive/ Rip Stop Nylon) |
|---|---|---|---|---|---|---|
| Thickness | μm | 330 | 178 | 457 | 635 | 685 |
| Basis Weight | g/m$^2$ | 119 | 105 | 251 | 387 | 292 |
| Flexibility | | | | | | |
| Face 1 | mg-cm | 5.6E+02 | 2.0E+02 | Not Measured | Not Measured | 2.2E+03 |
| Face 2 | mg-cm | 3.2E+03 | 1.6E+03 | Not Measured | Not Measured | 3.3E+03 |
| Agent | | | | Mustard (HD) | | |
| Loading | g/m$^2$ | | | 10 | | |
| Breakthrough Time | min | >180 | >720 | >720 | >720 | >20160 |
| | hrs. | >3 | >12 | >12 | >12 | >336 |
| Agent | | | | Soman (GD) | | |
| Loading | g/m$^2$ | | | 10 | | |
| Breakthrough Time | min | | >720 | >720 | >720 | >20160 |
| | hrs. | | >12 | >12 | >12 | >336 |

The above discussed greater than 336 hours (14 days) breakthrough times have been confirmed by independent testing. A summary of permeation testing results for a sample of multi-layer barrier fabric produced as described herein is shown below in Table 8.

TABLE 8

| | Units | Agent GD | Agent HD |
|---|---|---|---|
| Test Conditions | | | |
| Surface Area of Test Fabric Sample | cm$^2$ | 10 | 10 |
| Weight of CWA Challenge Volume | μg | 10 | 10 |
| Equivalent CWA Contamination Level | g/m$^2$ | 10 | 10 |
| Static-Diffusion Rate Protocol Parameters | | | |
| Air Flow Rate Top | L/min | 0 | 0 |
| Air Flow Rate Bottom | L/min | Not Reported | Not Reported |
| Performance Requirements | | | |
| Threshold Liquid Breakthrough Concentration | mg/m$^3$ | 0.0015 | 0.15 |
| Experimental Liquid Breakthrough Time | days | ≥14 | ≥14 |

TABLE 8-continued

| | Units | Agent GD | Agent HD |
|---|---|---|---|
| Test Results | | | |
| Multi-Layer Fabric Breakthrough Time | days | ≥14 | ≥14 |
| CWA Concentration in Bottom Air Flow on Day 14 | mg/m$^3$ | ≤0.0015 | ≤0.15 |

Under similar conditions, other commercially available fabrics exhibit greater CWA in the bottom airflow after shorter time periods. For example, Tychem SL may exhibit a CWA in the bottom airflow of at least 0.63 mg/m$^3$ after only 360 minutes.

A multi-layer barrier fabric produced as described above may be formed into a variety of types of enclosures or structures that are designed to contain hazardous material within (such that the environment containing hazardous material is disposed internal and the environment free of hazardous material is disposed external thereto) or to exclude hazardous material from entering (such that environment free of hazardous material is disposed internal and the environment containing hazardous material is disposed external thereto). In one embodiment, the multi-layer barrier fabric is formed into a COC with the environment containing hazardous material disposed internal to the COC, and the environment free of hazardous material disposed external to the COC. A COC may be an explosive projectile containment pouch adapted to contain an explosive projectile (e.g., a CWA or BWA filled munition, such as a 155 mm artillery shell), a human remains pouch (HRP) adapted to contain human or animal remains or body parts (e.g., that was exposed to a CWA, BWA or TIC), a contaminated equipment pouch adapted to contain equipment or supplies (e.g., high value equipment such as night vision goggles, computers, or other electronics contaminated with a CWA, BWA or TIC), or another type of COC. In another embodiment, the multi-layer barrier fabric is formed into a larger enclosure with the environment containing hazardous material disposed internal to the enclosure, and the environment free of hazardous material disposed external to the enclosure. A larger enclosure may be a quarantine area or isolation zone. One type of quarantine area or isolation zone may be an aircraft isolation zone, which isolates a portion of an aircraft or hanger to prevent contaminated cargo from contaminating the rest of the aircraft or hanger. In still another embodiment, the multi-layer barrier fabric is formed into a CP structure with the environment free of hazardous material disposed internal to the CP structure, and the environment with hazardous material disposed external to the CP structure. Such a protective structure may be a tent (e.g., a small individual tent, a large field command post tent, a hospital tent, a barracks tent, a storage warehouse tent, etc.).

A route for hazardous material to escape an enclosure or structure is leakage through seams used to join different pieces together. To prevent such leakage, one or more of the layers of each piece of the multi-layer barrier fabric may be seamed to each other by thermal or radiofrequency (RF) welding or another technique. As discussed above, the low-permeability fabric of the barrier layer 130 may be chemical resistant thermoplastic polymer film. Such a film, when seamed using thermal or RF welding, may provide a permeation coefficient at the seam that is substantial the same as a continuous region. Alternatively, or additionally, various adhesives may be used to join one or more of the layers of each piece of the multi-layer barrier fabric together, for example, with overlaps.

Figure 2A:
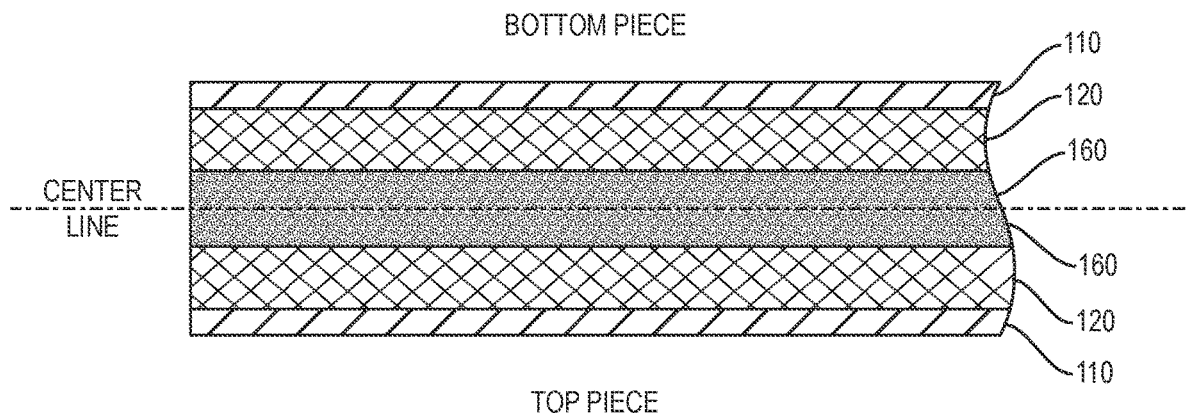
FIG. 2A is a schematic diagram of an example arrangement of a multi-layer thin, lightweight, flexible, strong barrier fabric ready for seaming at an edge.

FIG. 2A is a schematic diagram of an example arrangement of a thin, lightweight, flexible, strong multi-layer barrier fabric ready for seaming (e.g., by thermal or radio-RF welding or another technique) at an edge. In this example, the multi-layer barrier fabric is a three-layer stack such as the example discussed in reference to FIG. 1C above, that includes an inner layer 110, an adsorbent layer 120, and a combined barrier layer/outer layer 160. The two pieces to be seamed may be turned "inside-out" and pressed together such that the combined barrier layer/outer layers 160 of each contact. The edge of the two pieces may then be subject to thermal or radio-RF welding such that the barrier layer/outer layer 160 weld together in such region.

Figure 2B:
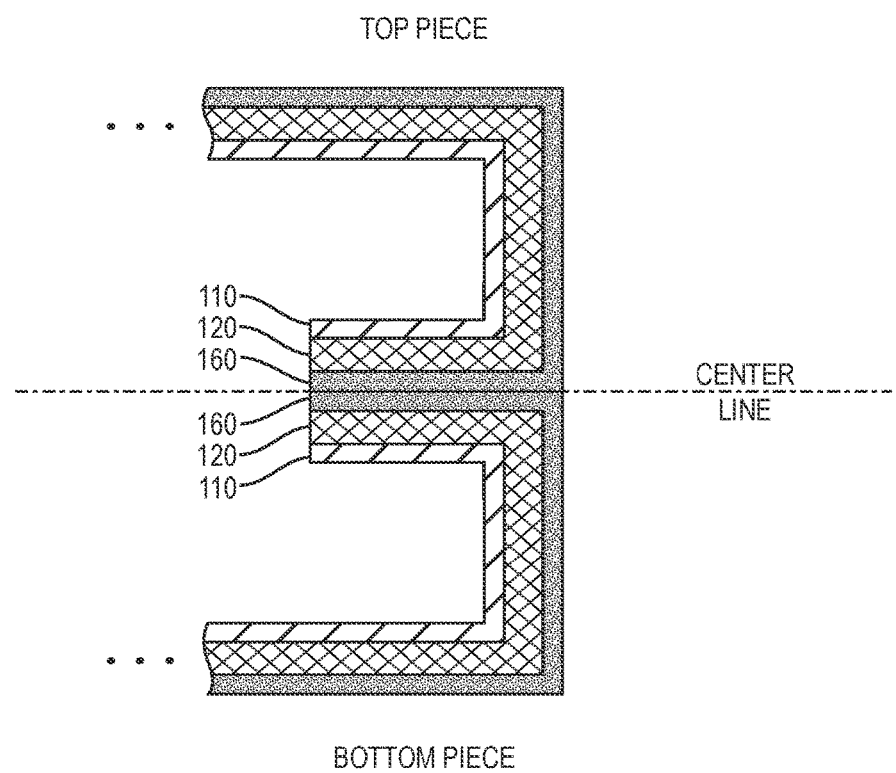
FIG. 2B is a schematic diagram of seamed thin, lightweight, flexible, strong multi-layer fabric laminate after inversion.

After forming the seam, the two pieces then may be inverted by passing one piece through an entry opening in the other piece. The pieces are now "right-side" out and the seam tucked. FIG. 2B is a schematic diagram of seamed, thin, lightweight, flexible, strong multi-layer fabric laminate after inversion.

The foregoing has been a detailed description of several embodiments. Further modifications and additions may be made without departing from the disclosure's intended spirit and scope. It should be understood that the ordering of any operations, or steps discussed above may be changed to suit various situations or requirements. Absent an explicit indication to the contrary, the order of operations or steps described above may be modified such that a subsequent step occurs before a preceding step, or in parallel to such step. Above all, it should be remembered that the above descriptions are meant to be taken only by way of example, and the invention is not restricted to any one particular embodiment, configuration or implementation discussed above. Rather, the invention is defined by the following claims.

What is claimed is:

1. A multi-layer barrier fabric adapted to provide a barrier against a hazardous material, the multi-layer barrier fabric comprising:
   an inner layer of facing fabric having an inner face configured to contact an environment containing hazardous material;
   an adsorbent layer of activated carbon fabric disposed adjacent to the inner layer and configured to adsorb the hazardous material to reduce concentration of the hazardous material and thereby permeation driving force;
   a barrier layer of low-permeability fabric disposed adjacent to the adsorbent layer of activated carbon fabric and configured to increase residence time of the hazardous material in the activated carbon fabric and to decrease escape probability of stray molecules of hazardous material that are not initially intercepted by the activated carbon fabric, wherein the barrier layer of the low-permeability fabric has a permeability to air less than or equal to 20 $cm^3/m^2/24$ hour at 1 atmosphere $\Delta P$ and a permeability to water vapor less than or equal to 40 $g/m^2/24$ hour at 38° C. and 90% relative humidity (RH); and
   an outer layer of facing fabric disposed adjacent to the barrier layer and having an outer face configured to contact an environment free of hazardous material.

2. The multi-layer barrier fabric of claim 1 wherein the multi-layer barrier fabric has a thickness less than or equal to 1000 micrometers (μm) and a weight less than or equal to 500 grams (g)/meter (m)$^2$.

3. The multi-layer barrier fabric of claim 1, wherein the hazardous material is a chemical warfare agent (CWA), biological warfare agent (BWA) or toxic industrial chemical (TIC).

4. The multi-layer barrier fabric of claim 1, wherein the inner layer of facing fabric and the outer layer of facing fabric each comprise a nylon or polyester fabric.

5. The multi-layer barrier fabric of claim 1, wherein the inner layer of facing fabric and the outer layer of facing fabric each comprise a ripstop fabric.

6. The multi-layer barrier fabric of claim 1, wherein the adsorbent layer of activated carbon fabric comprises a knitted, woven or non-woven activated carbon fabric.

7. The multi-layer barrier fabric of claim 1, wherein the barrier layer of low-permeability fabric comprises a chemical resistant thermoplastic polymer film.

8. The multi-layer barrier fabric of claim 1, wherein the inner layer of facing fabric and the inner layer of facing fabric each have a thickness of less than or equal to 0.10 millimeters (mm), the adsorbent layer of activated carbon fabric has a thickness less than or equal to 20 mm, and the barrier layer has a thickness less than or equal to 60 micrometers (μm).

9. The multi-layer barrier fabric of claim 1, wherein two or more pieces of the multi-layer barrier fabric are seamed to each other, wherein the seams includes a thermal or radio-frequency weld joining the barrier layers of low-permeability fabric of the respective pieces.

10. The multi-layer barrier fabric of claim 1, wherein two or more of the inner layer of facing fabric, the adsorbent layer of activated carbon fabric, the barrier layer of low-permeability fabric, and the outer layer of facing fabric are bonded to each other by hot melt adhesion.

11. The multi-layer barrier fabric of claim 1, wherein two or more of the inner layer of facing fabric, the adsorbent layer of activated carbon fabric, the barrier layer of low-permeability fabric, and the outer layer of facing fabric are bonded to each other by a permeable adhesive.

12. The multi-layer barrier fabric of claim 1, wherein the multi-layer barrier fabric is formed into a contaminated object container (COC) or enclosure with the environment containing hazardous material disposed internal to the COC or enclosure, and the environment free of hazardous material disposed external to the COC or enclosure.

13. The multi-layer barrier fabric of claim 12, wherein the COC or enclosure is an explosive projectile containment pouch, a human remains pouch (HRP), a contaminated equipment containment pouch, or an aircraft isolation structure.

14. The multi-layer barrier fabric of claim 1, wherein the multi-layer barrier fabric is formed into a collective protection (CP) structure with the environment free of hazardous material disposed internal to the CP structure, and the environment containing hazardous material disposed external to the CP structure.

15. The multi-layer barrier fabric of claim 13, wherein the CP structure is a tent.

16. A multi-layer barrier fabric adapted to provide a barrier against a hazardous material, the multi-layer barrier fabric comprising:
    an inner layer of nylon or polyester fabric having an inner face configured to contact an environment containing hazardous material;
    an adsorbent layer of knitted, woven or non-woven activated carbon fabric disposed to an outer side of the inner layer and configured to adsorb the hazardous material to reduce concentration of the hazardous material and thereby permeation driving force; and
    a barrier layer of chemical resistant thermoplastic polymer film that is substantially impermeable to air and water vapor disposed to an outer side of the adsorbent layer and configured to increase residence time of the hazardous material in the activated carbon fabric and to decrease escape probability of stray molecules of hazardous material that are not initially intercepted by the activated carbon fabric, wherein the barrier layer of the chemical resistant thermoplastic polymer film has a permeability to air less than or equal to 20 $cm^3/m^2/24$ hour at 1 atmosphere $\Delta P$ and a permeability to water vapor less than or equal to 40 $g/m^2/24$ hour at 38° C. and 90% relative humidity (RH).

17. The multi-layer barrier fabric of claim 16, wherein the multi-layer barrier fabric is formed into a contaminated object container (COC) or enclosure with the environment containing hazardous material disposed internal to the COC or enclosure, and the environment free of hazardous material disposed external to the COC or enclosure, wherein the COC or enclosure is an explosive projectile containment pouch, a human remains pouch (HRP), a contaminated equipment pouch, or an aircraft isolation structure.

18. The multi-layer barrier fabric of claim 16, wherein the multi-layer barrier fabric is formed into a collective protection (CP) structure with the environment free of hazardous material disposed internal to the CP structure, and the environment with the hazardous material disposed external to the CP structure, wherein the CP structure is a tent.

19. The multi-layer barrier fabric of claim 1, wherein the barrier layer of the low-permeability fabric has a permeability to air less than or equal to 4 $cm^3/m^2/24$ hour at 1 atmosphere $\Delta P$.

* * * * *